(12) United States Patent
Kernmayer et al.

(10) Patent No.: US 8,656,677 B2
(45) Date of Patent: Feb. 25, 2014

(54) CEILING PANEL FOR LINING INTERIORS OF VEHICLES

(75) Inventors: Georg Kernmayer, Vienna (AT); Manfred Standhartinger, Riedau (AT)

(73) Assignee: FACC AG, Ried Im Innkreis (AT)

( * ) Notice: Subject to any disclaimer, the term of this patent is extended or adjusted under 35 U.S.C. 154(b) by 549 days.

(21) Appl. No.: 12/936,234

(22) PCT Filed: Feb. 9, 2009

(86) PCT No.: PCT/AT2009/000046
§ 371 (c)(1),
(2), (4) Date: Oct. 4, 2010

(87) PCT Pub. No.: WO2009/121080
PCT Pub. Date: Oct. 8, 2009

(65) Prior Publication Data
US 2011/0024058 A1 Feb. 3, 2011

(30) Foreign Application Priority Data

Apr. 2, 2008 (AT) .................................. A 518/2008

(51) Int. Cl.
*E04B 2/00* (2006.01)
*E04C 2/00* (2006.01)

(52) U.S. Cl.
USPC ............. 52/506.05; 52/509; 52/511; 244/120

(58) Field of Classification Search
USPC ............ 52/506.01, 506.05, 506.06, 509, 511, 52/578, 579, 582.1, 582.2, 588.1; 105/423; 244/117 R, 118.1, 118.2, 244/118.5, 118.6, 119, 120; 296/214, 39.1
See application file for complete search history.

(56) References Cited

U.S. PATENT DOCUMENTS 2,181,831 A * 11/1939 McLaughlin, Jr. .......... 52/506.06
3,151,712 A * 10/1964 Jackson ........................ 428/174
(Continued)

FOREIGN PATENT DOCUMENTS

| CN | 2179885 Y | 10/1994 |
|---|---|---|
| DE | 4443526 C1 | 12/1995 |

(Continued)

OTHER PUBLICATIONS

PCT—International Preliminary Report on Patentability dated Oct. 5, 2010.

*Primary Examiner* — Brian Glessner
*Assistant Examiner* — Joseph J Sadlon
(74) *Attorney, Agent, or Firm* — Laurence A. Greenberg; Werner H. Stemer; Ralph E. Locher (57) ABSTRACT

A ceiling panel for lining the interior of a vehicle, particularly an airplane, includes a plastic composite element having elements disposed at lateral edges extending substantially in a movement direction of the vehicle for fastening to a supporting structure of the vehicle or parts connected thereto. At least one fixation device is provided on a transverse edge disposed substantially transversely to the movement direction and at least one counter piece is provided on an opposite transverse edge, as viewed in the movement direction, to avoid an offset in a perpendicular direction between consecutive ceiling panels. The at least one fixation device is configured to complement the at least one counter piece and a form-locking connection can be produced and detached again without tools in the substantially perpendicular direction, by the interaction of each fixation device with a respective counter piece.

20 Claims, 13 Drawing Sheets

(56) References Cited

U.S. PATENT DOCUMENTS

| | | | |
|---|---|---|---|
| 4,234,278 A * | 11/1980 | Harshman et al. | 410/69 |
| 5,411,782 A * | 5/1995 | Jarvis et al. | 428/57 |
| 5,601,034 A * | 2/1997 | Tao et al. | 105/423 |
| 5,658,042 A | 8/1997 | Rühringer et al. | |
| 5,709,056 A * | 1/1998 | Matsuyama et al. | 52/235 |
| 5,866,272 A * | 2/1999 | Westre et al. | 428/593 |
| 5,931,415 A * | 8/1999 | Lingard et al. | 244/129.5 |
| 6,129,413 A * | 10/2000 | Klein | 296/220.01 |
| 6,199,798 B1 * | 3/2001 | Stephan et al. | 244/129.4 |
| 6,296,302 B1 | 10/2001 | Lenkens | |
| 6,378,936 B1 | 4/2002 | Grimm et al. | |
| 6,533,343 B2 * | 3/2003 | Bohm et al. | 296/100.02 |
| 6,951,318 B1 * | 10/2005 | Petersen et al. | 244/114 R |
| 7,762,738 B2 | 7/2010 | Homner | |
| 8,490,922 B2 * | 7/2013 | Benthien et al. | 244/119 |
| 8,505,261 B2 * | 8/2013 | McClure | 52/713 |
| 8,511,609 B2 * | 8/2013 | Landmann | 244/119 |
| 2002/0124500 A1 * | 9/2002 | Thompson | 52/287.1 |
| 2006/0082192 A1 * | 4/2006 | Dubay et al. | 296/214 |
| 2006/0102786 A1 * | 5/2006 | Granzeier et al. | 244/119 |
| 2010/0176242 A1 | 7/2010 | Bock et al. | |

FOREIGN PATENT DOCUMENTS

| | | | |
|---|---|---|---|
| DE | 202006004081 U1 | 8/2007 | |
| DE | 102007013904 A1 | 9/2008 | |
| EP | 0894710 A2 | 2/1999 | |
| EP | 1088749 A2 | 4/2001 | |
| EP | 1288123 A2 | 3/2003 | |
| GB | 2222840 A * | 3/1990 | E04B 7/00 |
| WO | 9911479 A1 | 3/1999 | |

* cited by examiner

CEILING PANEL FOR LINING INTERIORS OF VEHICLES

BACKGROUND OF THE INVENTION

Field of the Invention

The invention relates to a ceiling panel for lining the interior of a vehicle, in particular an aircraft, comprising a plastic composite element having elements disposed at the lateral edges extending substantially in the movement direction of the vehicle for fastening to a supporting structure of the vehicle or parts connected thereto.

The present invention further relates to a ceiling lining for the interior of a vehicle, in particular an aircraft, comprising a plurality of ceiling panels disposed successively in the movement direction of the vehicle.

Although the present invention is primarily provided for use in aircraft, an application in other vehicles in which a weight reduction of the component parts is essential such as, for example, speed boats, high-speed trains or the like, is also feasible.

Ceiling panels and other covering panels used to configure the interior of aircraft or the like are increasingly being made of plastic composite materials for reasons of weight. The ceiling panels are used to line the area between the overhead luggage compartments in an aircraft. For rapid and easy assembly and disassembly, corresponding fastening elements are usually located on the lateral edges of the ceiling panels, by which means these panels can be fastened without tools to the supporting structure or parts of the aircraft connected thereto. For example, AT 404 926 B describes a correspondingly configured ceiling panel.

Particularly for reducing fuel consumption, the trend is towards increasingly lighter aircraft which is why all the components of an aircraft, including the interior lining, are being made increasingly lighter. In addition, designers are demanding increasingly smoother lines when designing the interior of aircraft. These design specifications make it difficult to construct particularly light covering panels and ceiling panels with simultaneously required high stiffness.

Whereas ceiling panels were previously stiffened by providing geometrical structures such as, for example, steps, on account of the specifications of industrial design imposed on developers, this is no longer possible or no longer desired. On the other hand, plastic composite parts should not be designed to be too stiff for sound technology reasons. In consequence, a sagging of the ceiling panels occurs due to gravity, in particular in the middle between the fastening elements at the lateral edges. In principle, a uniform sagging of the ceiling panels in the interior of an aircraft would not constitute a major problem if there were no differences here in the sagging between the individual ceiling panels. This offset in the vertical direction from one ceiling panel to the neighbouring ceiling panel is particularly disturbing. This negative visual effect is intensified by the ceiling panels being illuminated with light at a relatively flat angle by light fittings located above the overhead luggage compartments, with the result that shadowing occurs even with very small steps between the ceiling panels.

Naturally a sagging of the ceiling panels or an offset between the ceiling panels could be counteracted by additional fastening elements. However, such additional fastening elements would increase the weight and also the assembly and disassembly effort in an inadmissible manner. The same applies to stiffening structures which could be disposed on the ceiling panel.

BRIEF SUMMARY OF THE INVENTION

The object of the present invention is therefore to create an aforesaid ceiling panel and an aforesaid ceiling lining in which the offset in the vertical direction from one ceiling panel to the neighbouring ceiling panel can be minimised. At the same time, it should be possible to assemble and disassemble the ceiling panel as rapidly and simply as possible without the assistance of tools. Finally, a certain play or movement within certain limits should be permissible in the direction of movement of the vehicle and transversely thereto. Loose component parts which could get lost during assembly and disassembly should be avoided. The ceiling panel according to the invention or the ceiling lining according to the invention should be particularly easy and cost-effective to manufacture. Disadvantages of known devices should be avoided or at least reduced.

The objects are solved by an aforesaid ceiling panel, wherein at least one fixation device is provided on the transverse edge disposed substantially transversely to the movement direction and that at least one counter piece is provided on the opposite transverse edge as viewed in the movement direction, wherein the at least one fixation device is configured to complement the at least one counter piece, and a form-locking connection can be produced without tools in the substantially perpendicular direction, and detached again, by interaction of each fixation device with one counter piece each. The present invention provides fixation devices or corresponding counter pieces at the transverse edges of the ceiling panel, by which means the ceiling panels can be connected to one another without tools. In this way, an offset of the ceiling panels in the vertical direction can be avoided as far as possible. The fixation devices and counter pieces can be manufactured to be relatively small and cheaply so that the overall weight of the ceiling panel is only insignificantly increased and the ensuing increased costs can be kept very low. In the configuration of the fixation devices and counter pieces, it is important that the usual work steps during mounting or dismounting the ceiling panels must not be substantially changed in such a way that only specially trained staff can carry out the work steps.

Preferably each fixation device and/or each counter piece has a component part which can be moved against the spring force of a spring element during the making and releasing of the positive connection. By providing a spring element, assembly and disassembly can only take place when intentionally overcoming the spring force of this spring element. The spring force is selected so that unintentional release of the form-locking connection between fixation device and counter piece can be eliminated but on the other hand, the force expended during the assembly and disassembly can be as low as possible.

According to one embodiment, the fixation device and the counter piece can be formed by correspondingly shaped bent metal parts. The bent metal parts of the fixation device and the corresponding counter piece are configured so that in the mounted state of the ceiling panel, they engage and form a form-locking connection in the perpendicular direction. A disadvantage with bent metal parts are the ensuing sharp edges, which can lead to damage to components of the interior lining of the vehicle, for example, cables, insulation, etc. In order to obviate this problem, corresponding protective covers can be provided around the bent metal parts, or the bent metal parts can, for example, be provided with a plastic layer, which however again increases the manufacturing expense and the weight.

Alternatively to this, the fixation device can be formed by a housing and a latch spring-mounted in the housing by means of a spring element and the complementary counter piece can be formed by a receptacle for a part of the latch. In such a construction, sharp edges can be avoided. Furthermore, fixation devices and counter pieces configured in such a manner can be relatively small and therefore manufactured easily and cost-effectively.

Preferably the housing, the latch and the receptacle are formed from plastic. In this case, injection moulding is particularly suitable for producing suitably shaped components.

In addition to the spring mounting of the latch, it can also be advantageous if the receptacle on the counter piece is spring-mounted. As a result, the necessary travel range of the latch during assembly and disassembly of a ceiling panel is halved in the most favourable case compared with the variant in which only the latch is spring-mounted.

In order to ensure optimal snapping of the latch into the receptacle, the latch is configured to taper towards the free end. This tapering configuration can, for example, be configured to be wedge-shaped in cross-section, in which case, in order to avoid sharp edges, these can be suitably rounded.

It is also possible to configure the free end of the latch to be rounded in cross-section. Such a configuration facilitates the mounting and dismounting of the ceiling panel since the latches of the fixing elements can be moved correspondingly easily into the receptacles of the counter pieces and out again.

The spring element on the fixation device, but also if necessary on the counter piece, can be formed by a helical spring, leaf spring and also, for example, by a resilient plastic body. When selecting the suitable spring element, account must be taken inter alia of the expected movement cycles, the expected spring force and, for example, environmental influences. Through the choice of specific spring element, the desired spring force can also be adjusted, which needs to be adjusted accordingly, for example, for holding the respective weight of the ceiling panel.

The at least one fixation device and the at least one counter piece are preferably detachably connected to the plastic composite element, for example, screwed, riveted or connected with clips. The screw connection of the fixation device and the counter piece is preferably made ex factory after manufacturing the ceiling panel. As a result of the screw connection, the fixation device and the counter piece can easily be exchanged.

Alternatively to this, the fixation device and the counter piece can naturally be adhesively bonded to the plastic composite element. However, it is then not possible or not easily possible to exchange the fixation device or the counter piece.

Preferably one fixation device is disposed at the centre of the transverse edge and one counter piece is disposed at the centre of the opposite transverse edge of the ceiling panel. As a result, the weight of the ceiling panel is merely increased by one fixation element and one counter piece. In the case of particularly large or wide ceiling panels, it may also be necessary to arrange a plurality of fixation devices and corresponding counter pieces along the transverse edges in order to ensure that no offset occurs between the ceiling panels in the perpendicular direction.

According to a further feature of the invention, it is provided that the fixation device and the counter piece are constructed identically. In this case, the structure of the fixation element or counter piece must be configured so that an intermeshing of the oppositely disposed fixation device and the counter piece is possible. Due to the identical structure of the two components, the manufacturing costs can be further reduced and incorrect assemblies can be avoided.

The plastic composite element of the ceiling panel is preferably formed from a honeycomb core with prepreg layers disposed on both sides. Such a structure of plastic composite materials known per se is characterised by particularly low weight with high stiffness at the same time. By means of appropriate construction variants such as, for example, the so-called "crushing" of the honeycomb core, the sound-absorbing effect of the ceiling panels can be improved.

The fastening elements are preferably formed on one lateral edge of the ceiling panel by appropriate moveable bearings and the fastening elements on the opposite lateral edge are formed by appropriate fixed bearings.

For covering the gap between the ceiling panels, a sealing lip, preferably made of silicone, is disposed on at least one transverse edge. The sealing lip is disposed on that side of the transverse edge of the ceiling panel, facing away from the interior of the vehicle.

The object according to the invention is also achieved by an aforesaid ceiling lining for the interior of a vehicle, in particular an aircraft, comprising a plurality of ceiling panels having the features specified above, disposed successively in the movement direction of the vehicle.

The present invention will be explained in detail with reference to the enclosed drawings.

DESCRIPTION OF THE INVENTION

Figure 1:
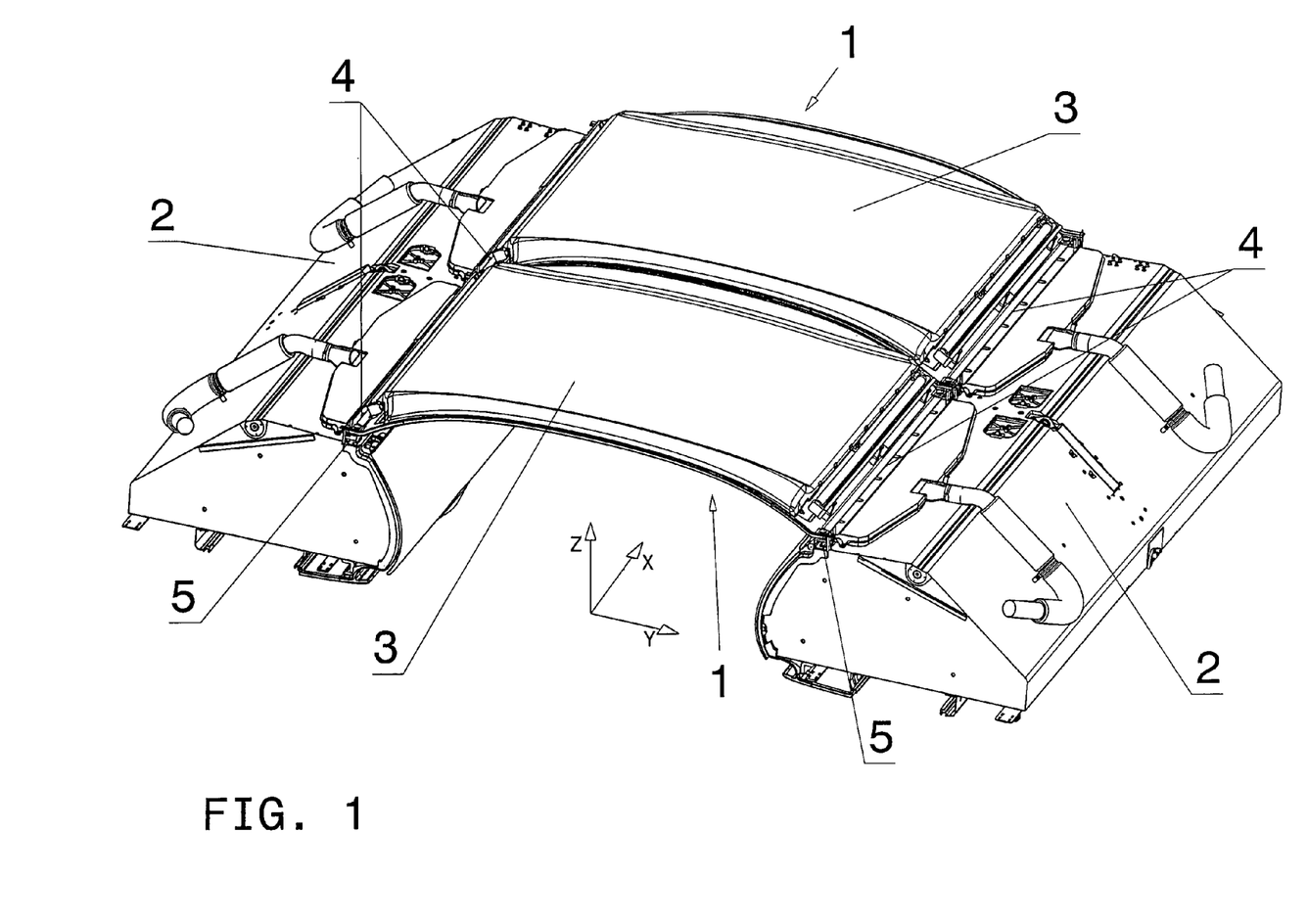
FIG. 1 shows a perspective view of two ceiling panels disposed between the overhead luggage compartments in an aircraft.

FIG. 1 shows a perspective view of a part of a ceiling lining in the interior of an aircraft, comprising two ceiling panels 1, which define the interior of the aircraft above the luggage storage compartments 2. The ceiling panels 1 each consist of a plastic composite element 3 having elements 5 disposed on the lateral edges 4 extending substantially in the movement direction X of the aircraft for fastening to a supporting structure of the aircraft or parts associated therewith. Details of the configuration of the fastening elements 5 are not apparent in the figures. The fastening elements 5 are preferably formed by appropriate movable bearings on one lateral edge 4 and by appropriate fixed bearings on the opposite lateral edge 4.

Since the ceiling panels 1 are broader than the clear width between the luggage storage compartments 2, during installation and dismantling, they must be threaded in obliquely between the luggage storage compartments 2 and suitably fastened above the luggage storage compartments.

Figure 2:
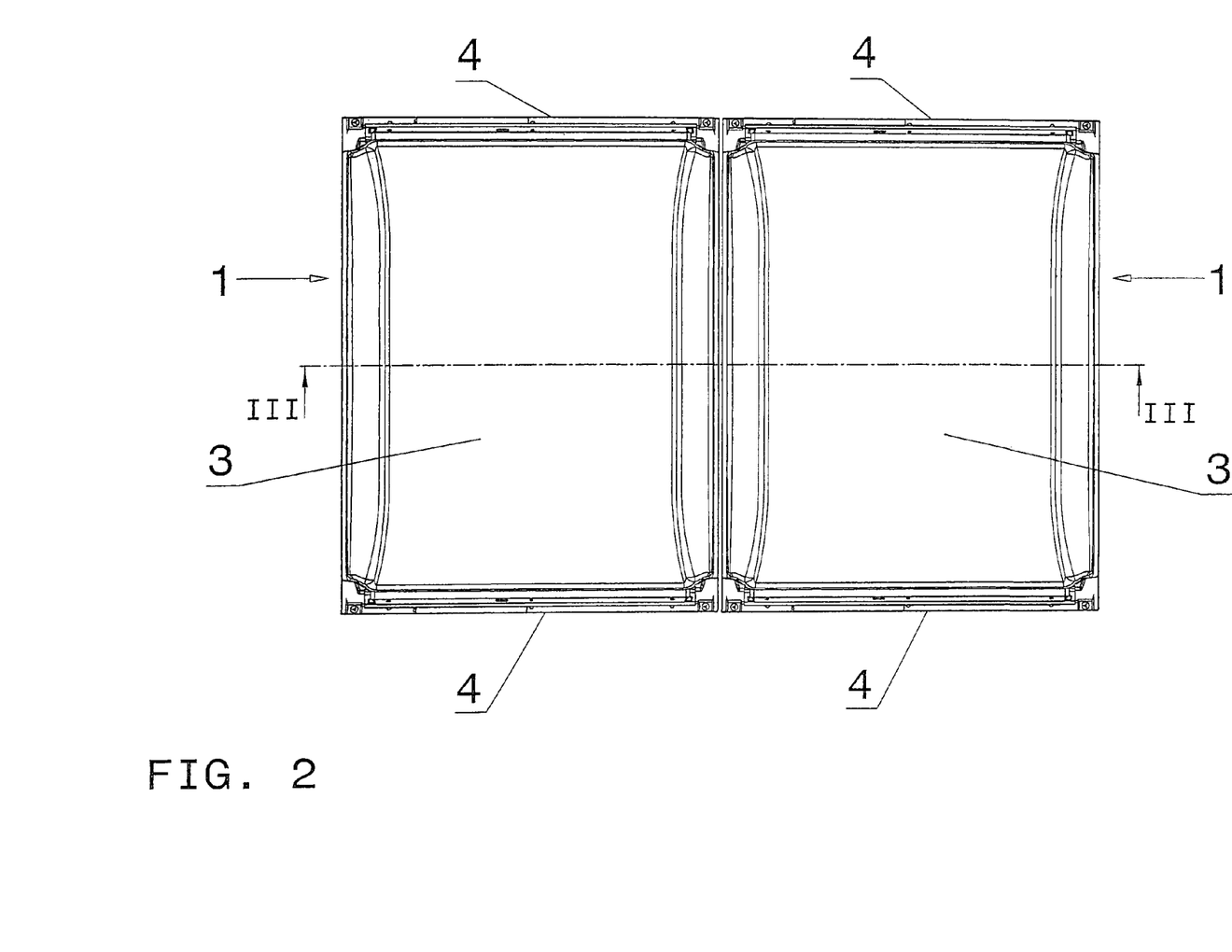
FIG. 2 shows a plan view of two ceiling panels.
Figure 3:
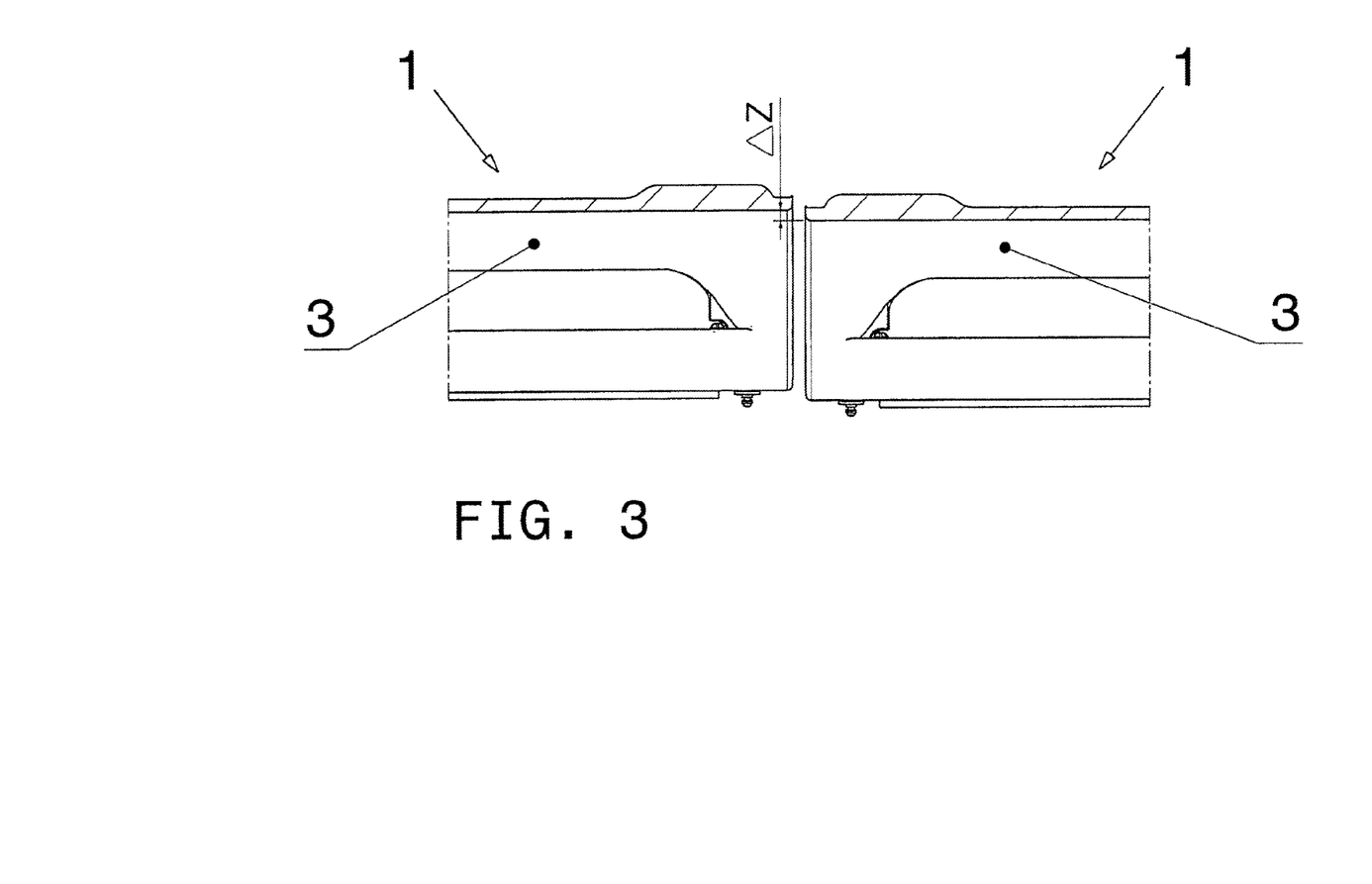
FIG. 3 shows a sectional view through the ceiling panels from FIG. 2 along the line of intersection III-III in the area of the transition from one ceiling panel to the other ceiling panel to illustrate the offset in the Z direction.

As can be seen in FIG. 2 and the detailed view according to FIG. 3, an offset ΔZ can occur between two ceiling panels 1 in the Z direction, i.e. in substantially the perpendicular direction. The aim of the present invention is to keep this offset ΔZ between the ceiling panels 1 as small as possible.

Figure 4:
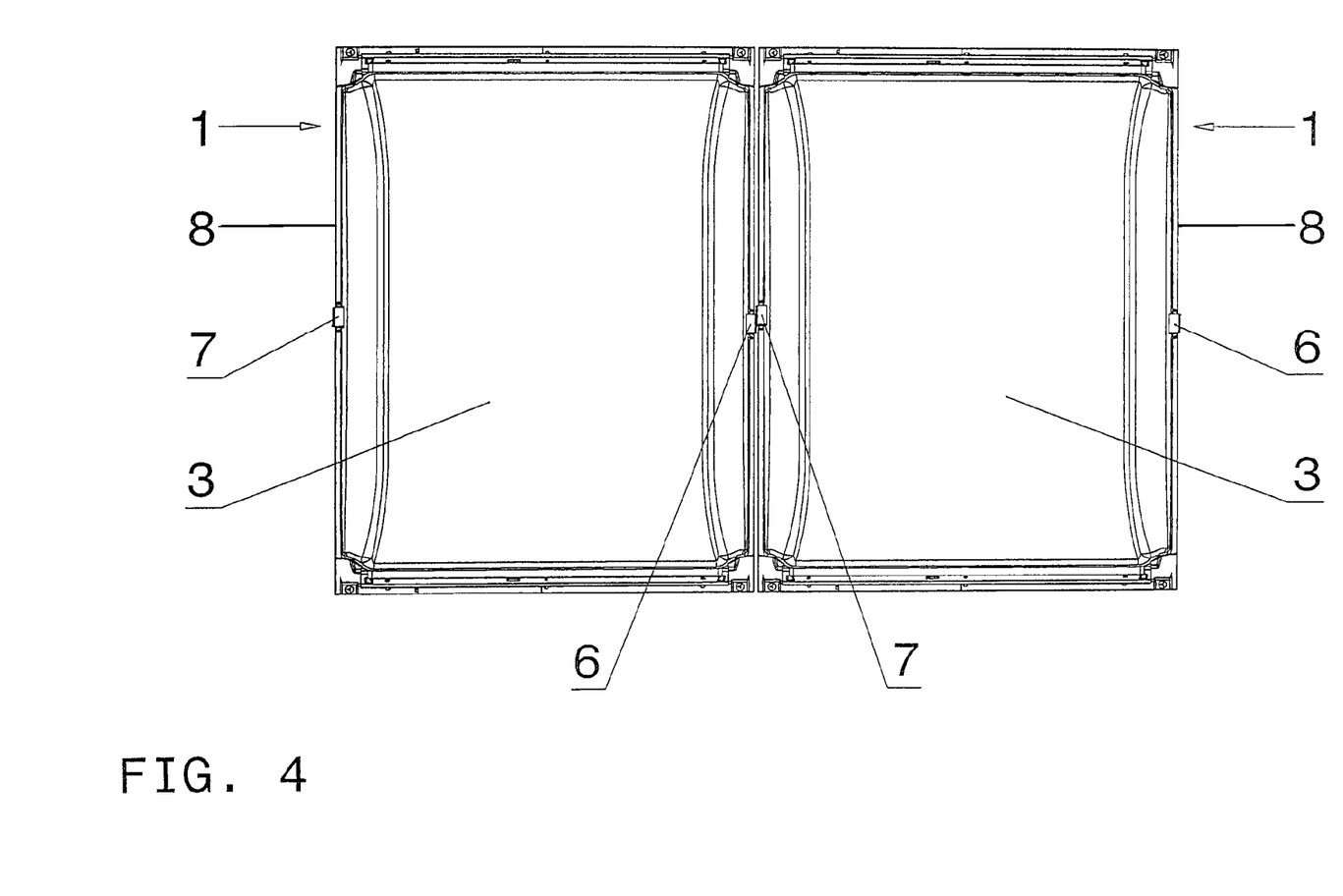
FIG. 4 shows two ceiling panels according to the invention in plan view.

As can be seen from FIG. 4, this is accomplished by means of at least one fixation device 6 and a counter piece 7 on each ceiling panel 1, which is provided on the transverse edge 8 disposed substantially transversely to the movement direction X, i.e. in the Y direction (see FIG. 1). The at least one fixation device 6 on the transverse edge 8 of the ceiling panel 1 is configured to complement the at least one counter piece 7 on the opposite transverse edge 8 of the ceiling panel 1, so that a form-locking connection between two neighbouring ceiling panels 1 can be produced in the substantially perpendicular direction, i.e. in the Z direction, without tools, and can be detached again by interaction of each fixation device 6 with respectively one counter piece 7. According to the invention, it is therefore provided that corresponding fixation devices 6 or counter pieces 7 are disposed on the transverse edges 8 of each ceiling panel 1 or plastic composite element 3, which interconnect the ceiling panels 1 so that an offset ΔZ in the perpendicular direction can be prevented. It is important that the connection between the ceiling panels 1 can be made without tools and can be detached again. Furthermore, the weight of the ceiling panels 1 should not be substantially increased by the at least one fixation device 6 and the at least one counter piece 7 and the associated increased costs should be as low as possible. The construction should also allow the individual dismantling of each ceiling panel 1 within a ceiling lining.

Figure 5:
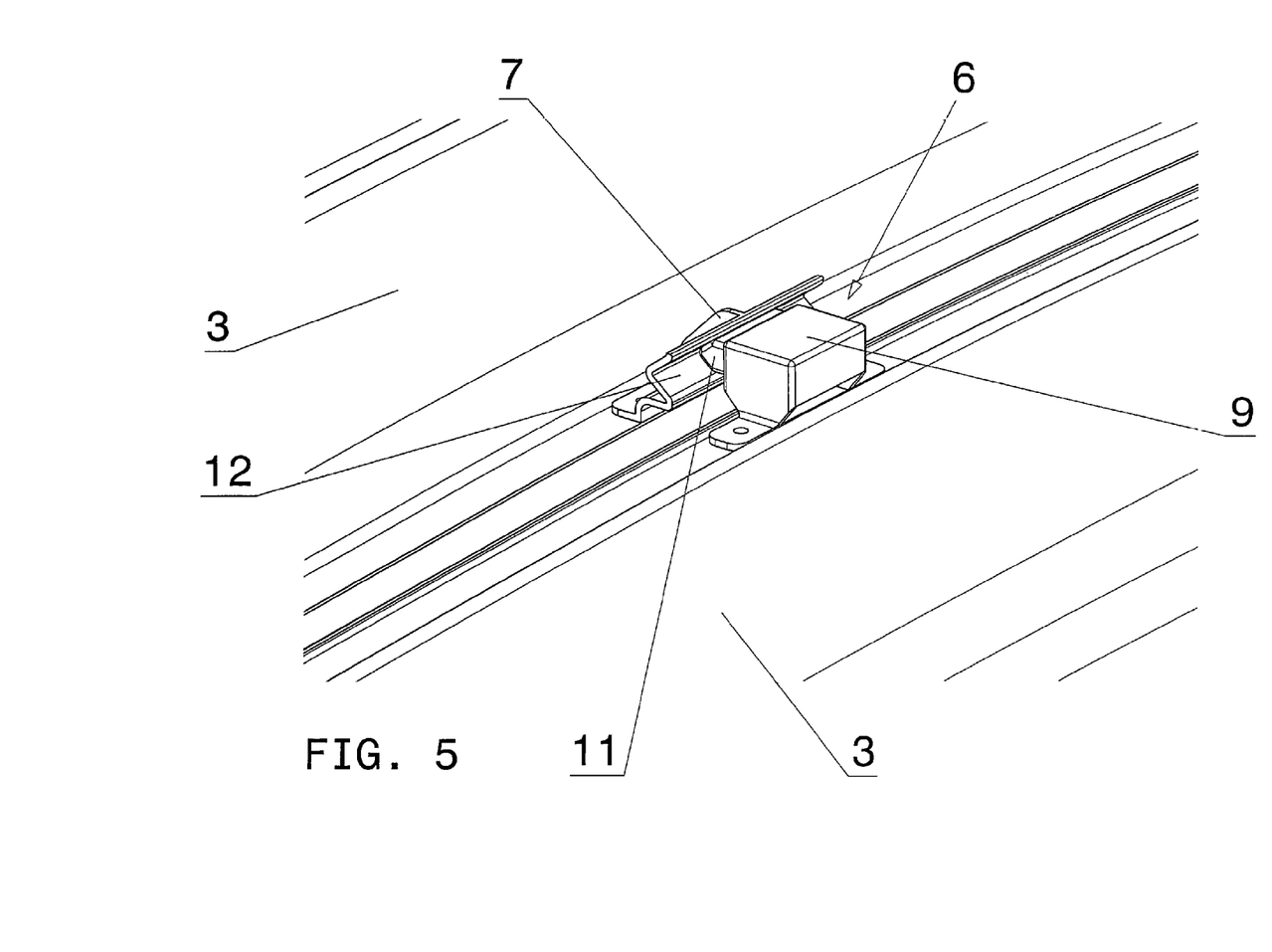
FIG. 5 shows an embodiment of a fixation device and a corresponding counter piece in perspective view.
Figure 6:
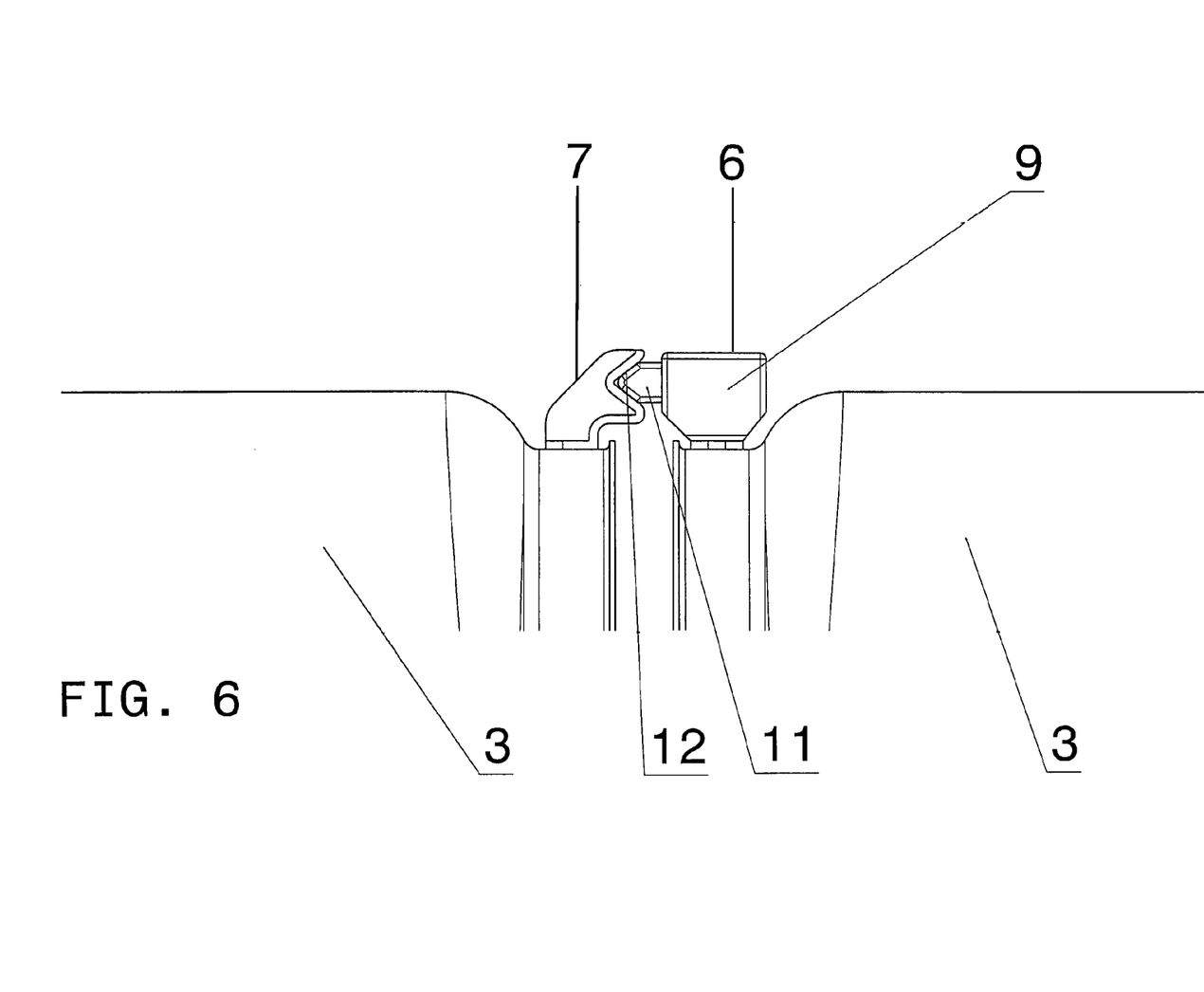
FIG. 6 shows the arrangement according to FIG. 5 in side view.
Figure 7:
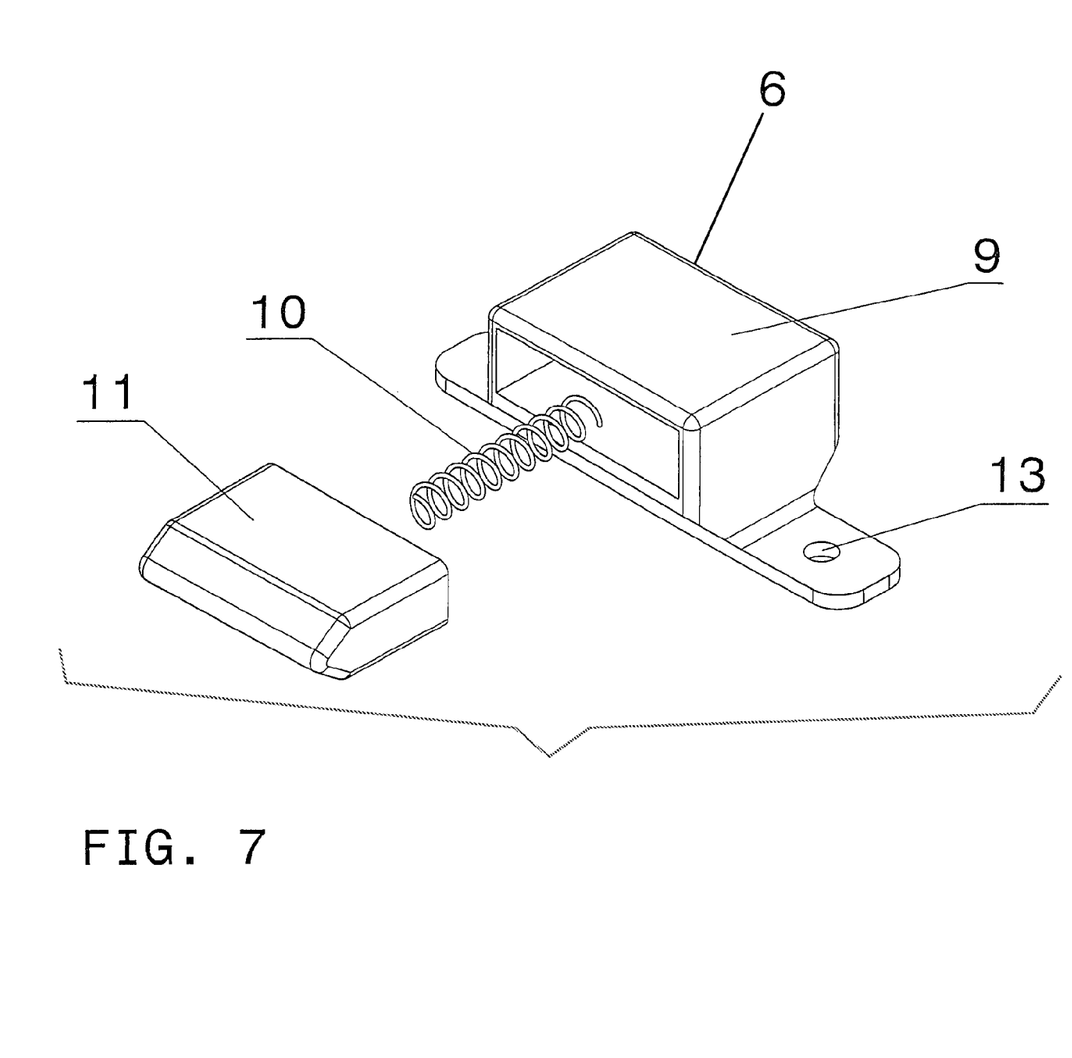
FIG. 7 shows the embodiment of the fixation device according to FIG. 5 and FIG. 6 in exploded view.

FIGS. 5 and 6 show an embodiment of a fixation device 6 and a counter piece 7 configured in a complementary manner thereto, wherein the fixation device 6 is formed by a housing 9 and a latch 11 spring mounted in the housing 9 by means of a spring element 10. The structure of such a fixation device 6 can be seen in the exploded view according to FIG. 7. In this case, the spring element 10 is formed by a helical spring. Other embodiments, for example, by a leaf spring or a resilient plastic body, are also feasible. The counter piece 7 formed by the fixation device 6 is formed by a receptacle for a part of the latch 11. The housing 9, the latch 11 of the fixation device 6 and the receptacle 12 of the counter piece 7 are preferably made of plastic, in particular by injection moulding. Fixing screws arranged through corresponding holes 13 can be provided (not shown) for fastening the fixation device 6 and the counter piece 7 on the plastic composite element 3 of the ceiling panel 1. Likewise, mounting the fixation device 6 and the counter piece 7 by adhesive bonding with the plastic composite element 3 is also feasible. The free end of the latch 11 of the fixation device 6 is configured to be tapering, in the example shown having a conical cross-section. The edges are preferably rounded in this case. The receptacle 12 of the counter piece 7 is configured to complement the free end of the latch 11. Thus, the latch 11 can be snapped into the receptacle 12 when mounting the ceiling panel 1 and the latch 11 can be displaced against the spring force of the spring element 10 when dismounting the ceiling panel 1 without tools. The receptacle 12 of the counter piece 7 can also be spring-mounted.

Instead of a pointed embodiment of the free end of the latch 11, the free end of the latch 11 can also be configured to be rounded. It is important for the configuration of the fixation device 6 and the counter piece 7 that a displacement in the transverse direction, i.e. in the Y direction (see FIG. 1) and also a certain clearance in the movement direction X is permissible for assembly and disassembly of the ceiling panel 1 whereas the connection between the ceiling panels 1 should not allow any clearance or any offset ΔZ.

Figure 8:
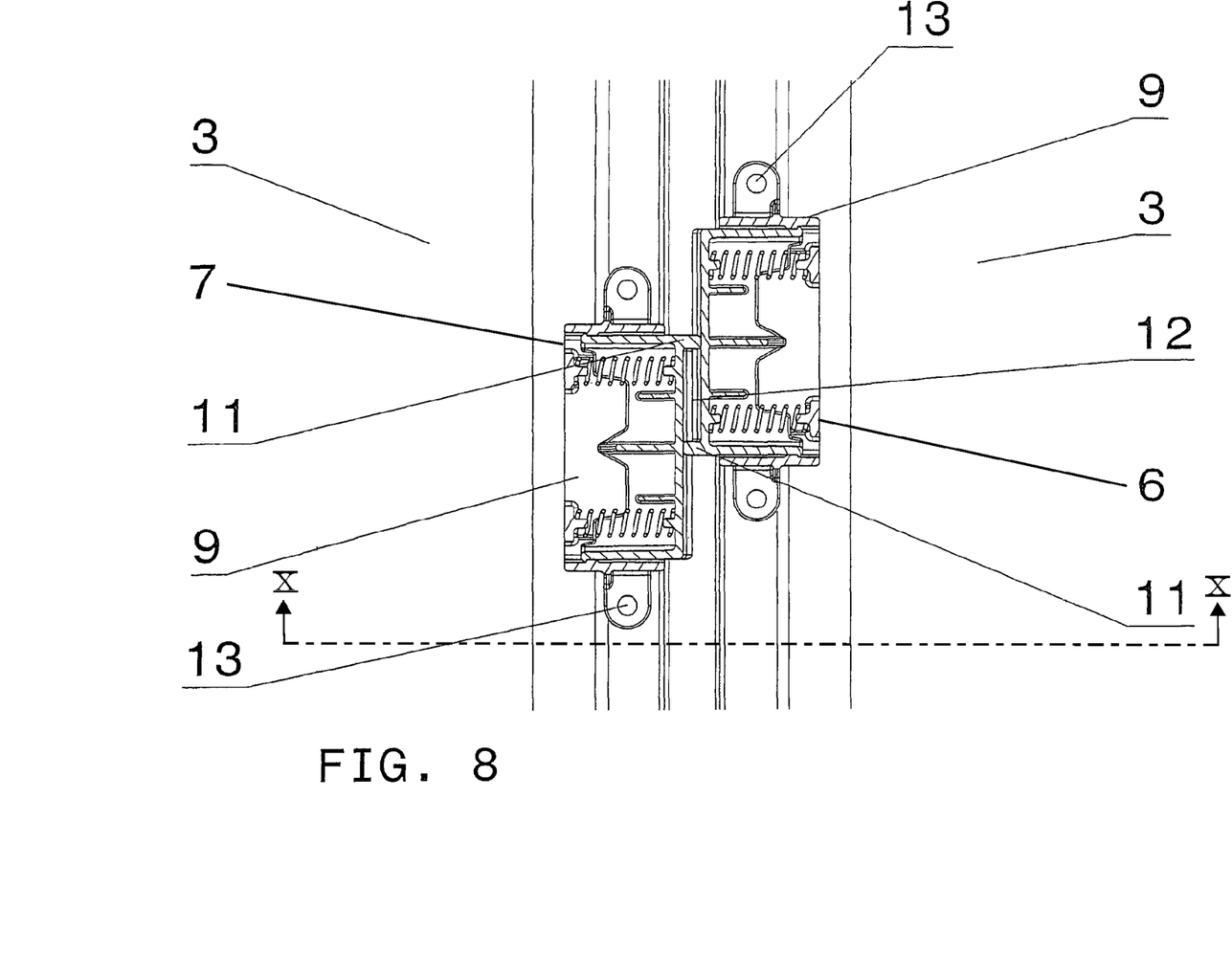
FIG. 8 shows a further embodiment of a fixation device and an corresponding counter piece in plan view.

FIG. 8 shows a further preferred embodiment of a fixation device 6 and a corresponding counter piece 7 by two identically constructed components. Accordingly, the fixation device 6 or the counter piece 7 is formed by a housing 9 with a lock 11, which at the same time forms the receptacle 12 for the lock 11 of the counter piece 7. An identically constructed configuration of the fixation device 6 and the counter piece 7 reduces the manufacturing costs and also facilitates assembly on the ceiling panel 1 since there is no need to pay attention to which transverse edge 8 of the ceiling panel 1 the fixation device 6 and the counter piece 7 must be fastened.

Figure 9:
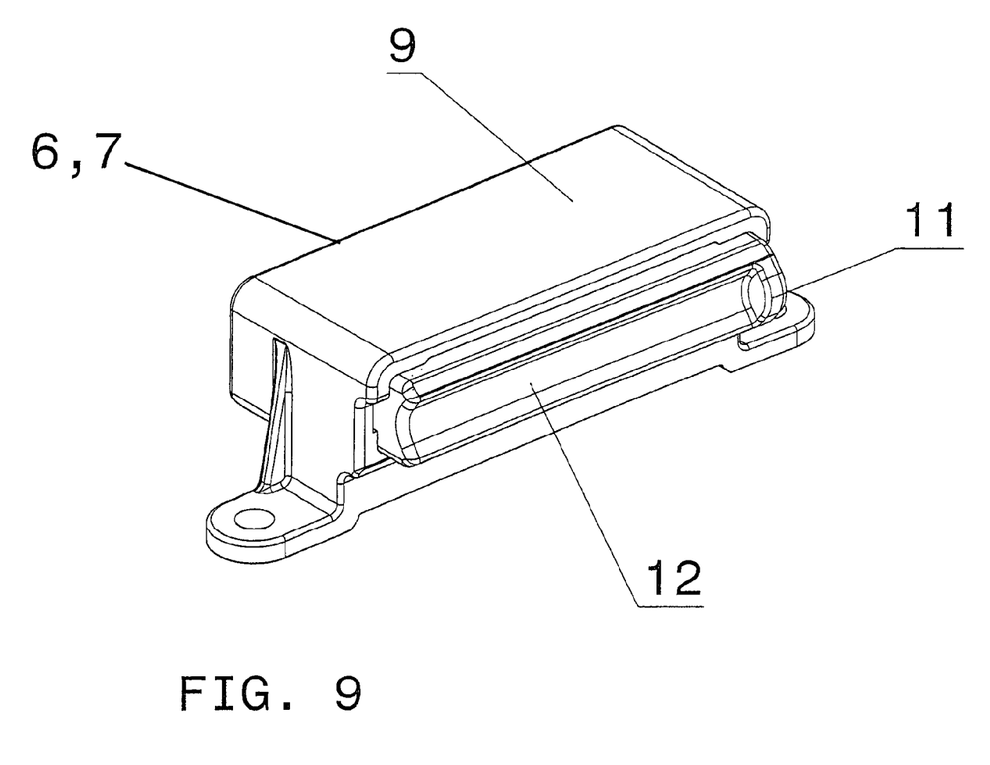
FIG. 9 shows the fixation device or the counter piece according to FIG. 8 in perspective view.

FIG. 9 shows another perspective view of such a fixation device 6 or such a counter piece 7.

Figure 10:
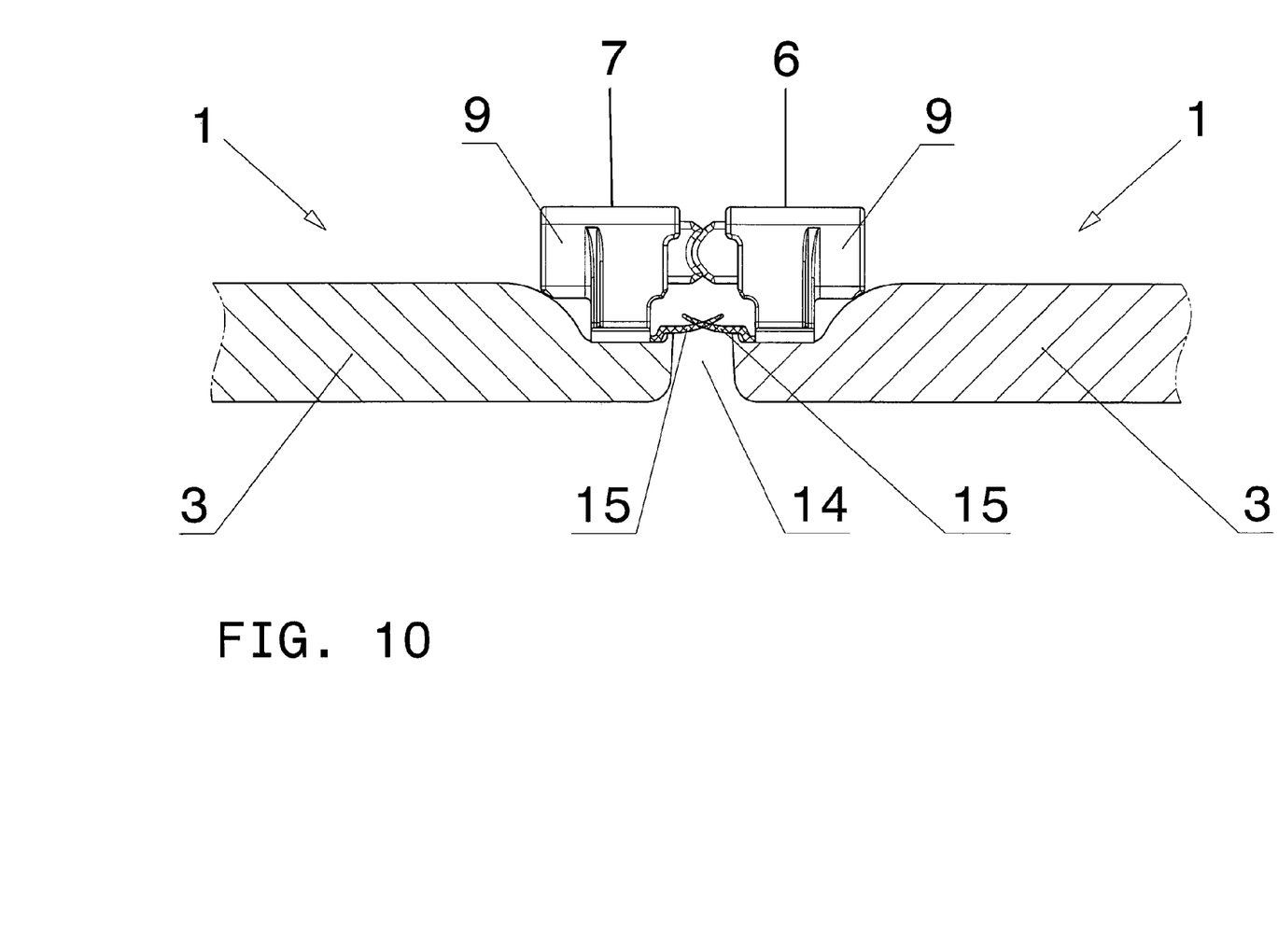
FIG. 10 shows a sectional view, taken along the line X-X of FIG. 8, in the direction of the arrows, through two ceiling panels having a fixation device or a counter piece according to FIGS. 8 and 9.

FIG. 10 shows a sectional view through two ceiling panels 1 in the region of the transition with a fixation device 6 or a counter piece 7 in accordance with FIGS. 8 and 9. In the transition region of the two ceiling panels 1, sealing lips 15 are provided to bridge the gap 14 between the two ceiling panels 1, which sealing lips can be made, for example, of silicone. In the exemplary embodiment shown the housing 9 of the fixation device 6 or of the counter piece 7 is arranged in a suitably stepped manner to provide space for the sealing lips 15.

Figure 11:
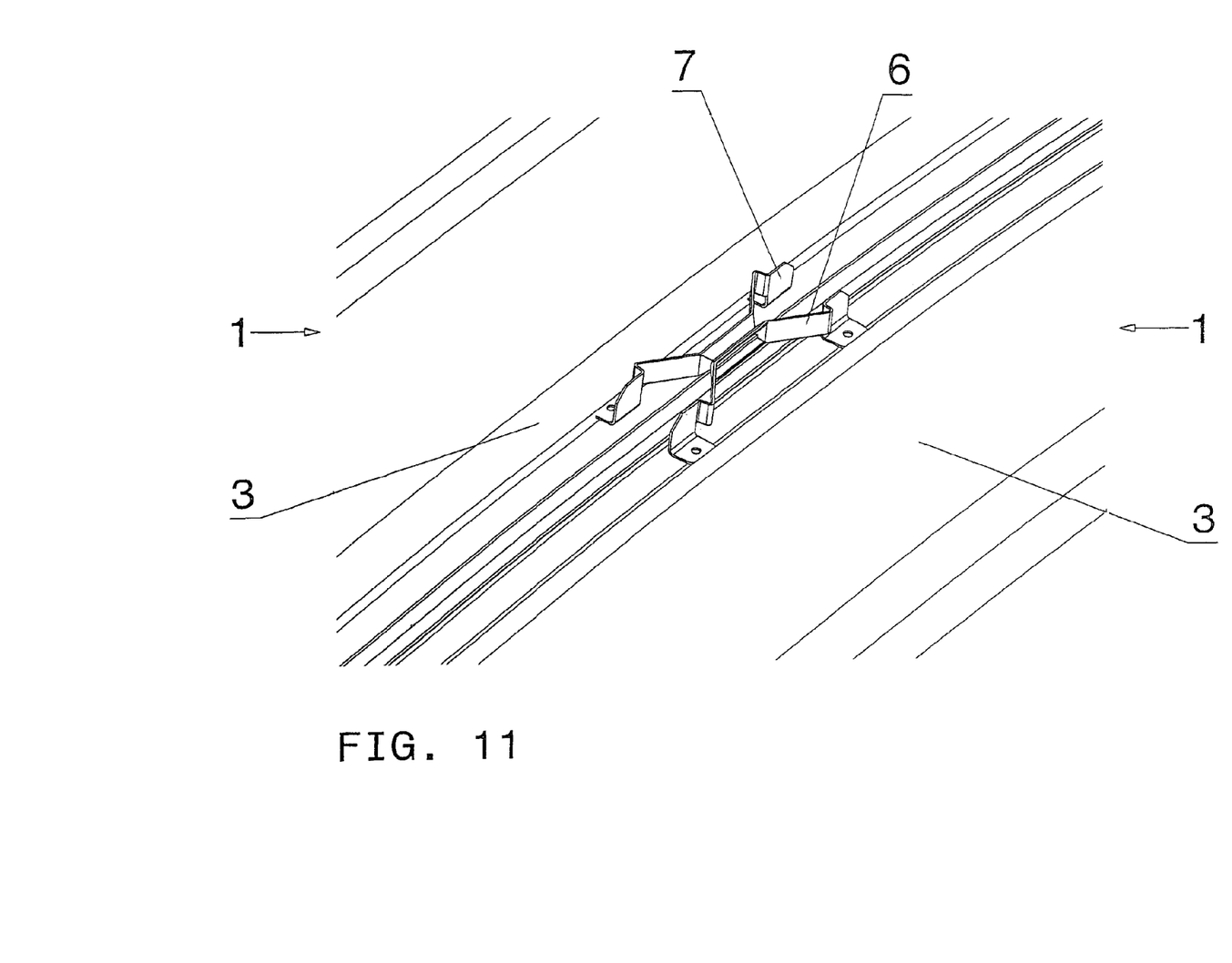
FIG. 11 to FIG. 13 show different embodiments of fixation devices and counter pieces manufactured by appropriate bent metal parts.
Figure 12:
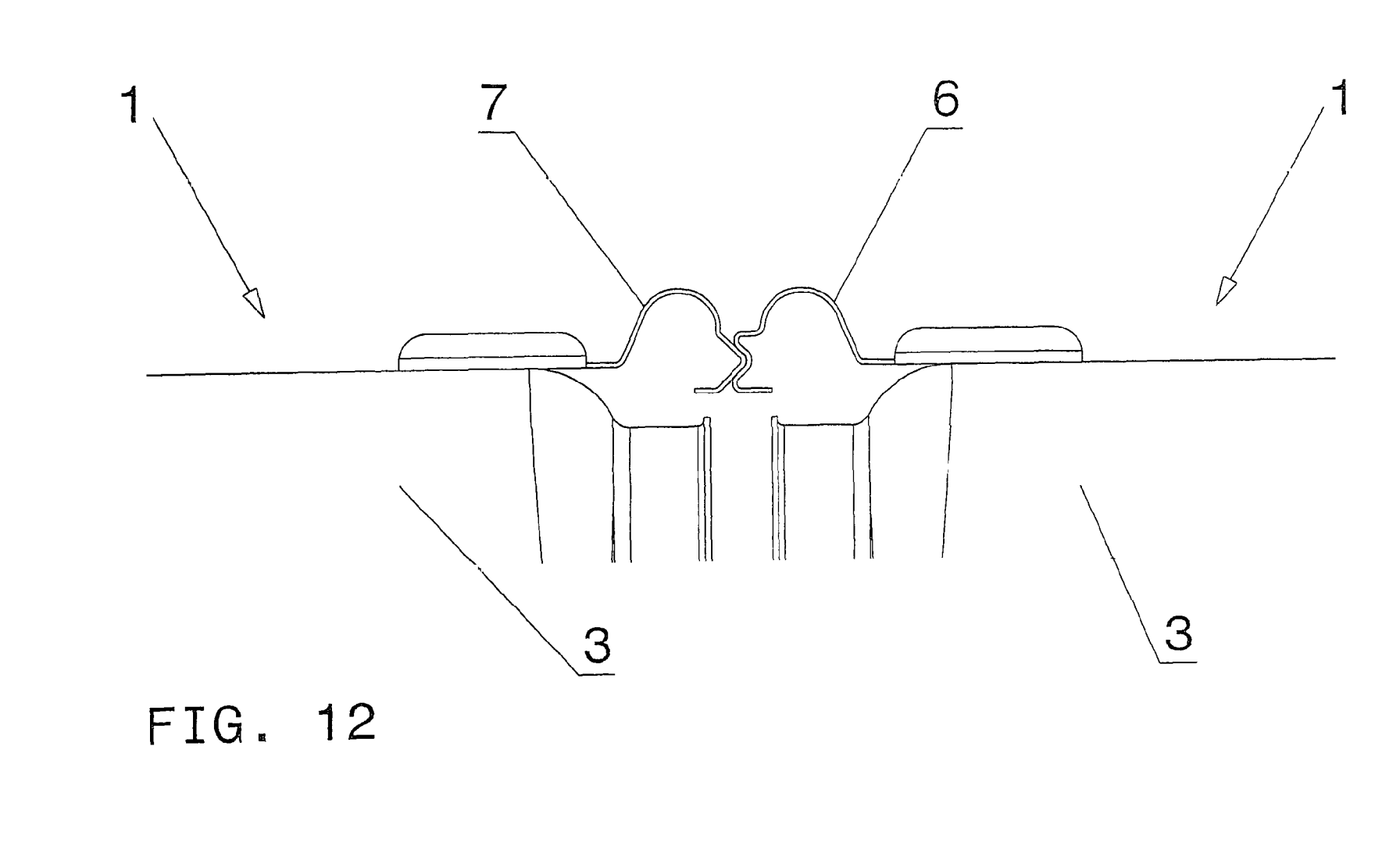
Figure 13:
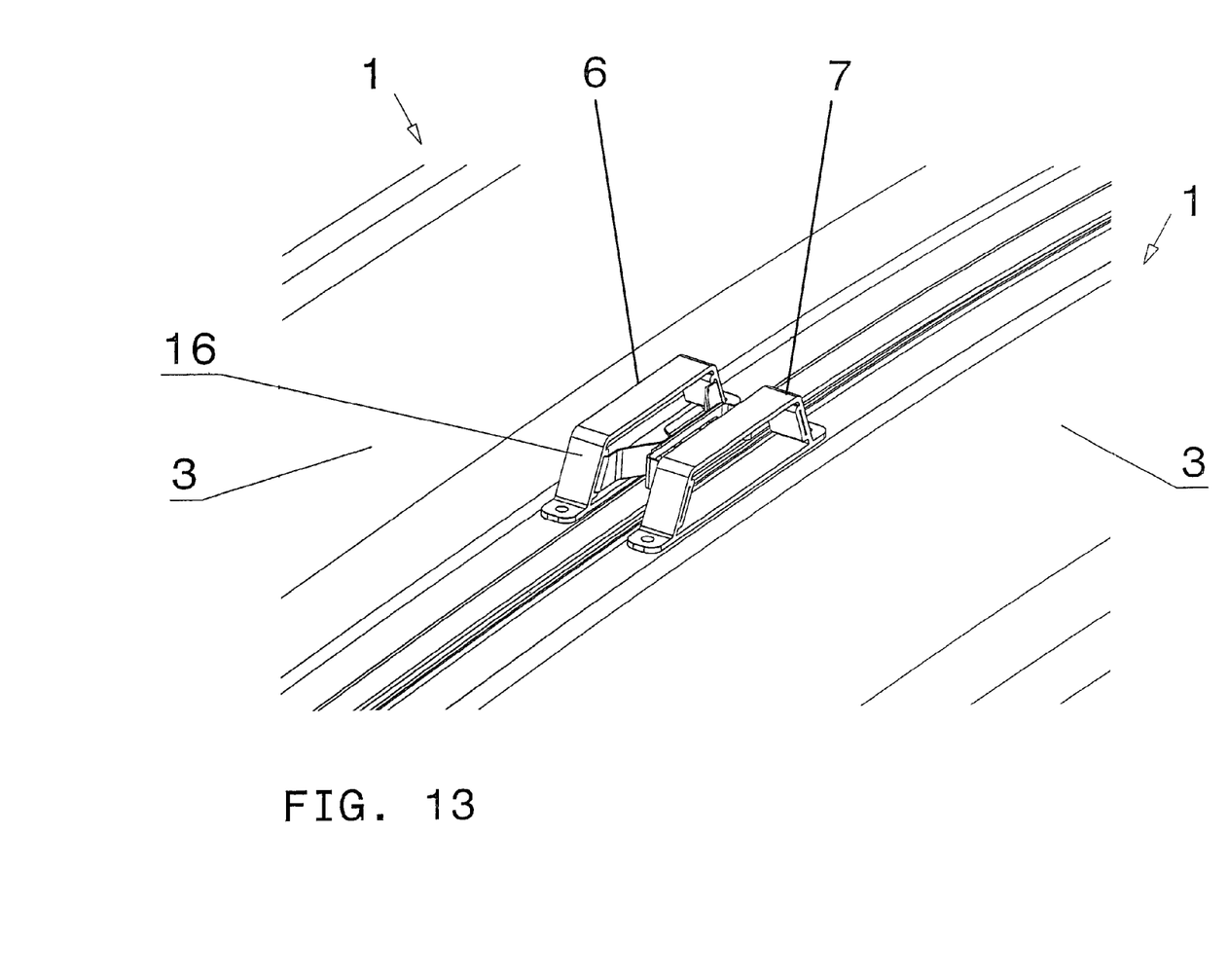

FIGS. 11, 12 and 13 show three further embodiments of fixation devices 6 and counter pieces 7 configured in a complementary manner thereto, such as can be made of bent metal parts. It is important in this case that the configuration must allow a movement in the X and Y direction whereas a form-locking connection is made in the Z direction. Since bent metal parts usually have relatively sharp edges, it is practical to cover these, for example, with suitable covers 16 and thus protect other components of the inner lining from being damaged by the sharp edges of the bent metal parts.

The invention claimed is:

1. A ceiling panel for lining an interior of a vehicle, the ceiling panel comprising:
   a plastic composite element having lateral edges extending substantially in a movement direction of the vehicle having the interior to be lined with the ceiling panel and transverse edges extending substantially transversely to the movement direction of the vehicle having the interior to be lined with the ceiling panel, said plastic composite element defining a direction perpendicular to said plastic composite element;
   elements disposed at said lateral edges for fastening to a supporting structure of the vehicle or parts connected thereto;
   at least one fixation device on one of said transverse edges;
   at least one counter piece on another of said transverse edges disposed opposite said one of said transverse edges in the movement direction of the vehicle;
   said at least one fixation device and said at least one counter piece being complementary;
   one of said at least one fixation device interacting with a respective one of said at least one counter piece of another plastic composite element for attaching and detaching a form-locking connection without tools substantially in the perpendicular direction; and said form-locking connection being configured to prevent an offset in the perpendicular direction between said plastic component element and said other plastic composite element.

2. The ceiling panel according to claim 1, wherein at least one of said at least one fixation device or said at least one counter piece has a latch to be moved against a spring force of a respective spring element attaching and detaching said form-locking connection.

3. The ceiling panel according to claim 1, wherein said at least one fixation device and said at least one counter piece are formed by bent metal parts.

4. The ceiling panel according to claim 1, wherein said at least one fixation device includes a housing, a spring element and a latch spring-mounted in said housing by said spring element, and said at least one complementary counter piece includes a receptacle for a part of said latch.

5. The ceiling panel according to claim 4, wherein said housing, said latch and said receptacle are formed of plastic.

6. The ceiling panel according to claim 4, wherein said receptacle is spring-mounted.

7. The ceiling panel according to claim 4, wherein said latch tapers towards a free end.

8. The ceiling panel according to claim 7, wherein said free end of said latch has a rounded cross section.

9. The ceiling panel according to claim 4, wherein said spring element is formed of a helical spring.

10. The ceiling panel according to claim 4, wherein said spring element is formed of a leaf spring.

11. The ceiling panel according to claim 4, wherein said spring element is formed of a resilient plastic body.

12. The ceiling panel according to claim 1, wherein said at least one fixation device and said at least one counter piece are detachably connected to said plastic composite element.

13. The ceiling panel according to claim 1, wherein said at least one fixation device and said at least one counter piece are adhesively bonded to said plastic composite element.

14. The ceiling panel according to claim 1, wherein a one of said at least one fixation device is disposed at a center of a transverse edge and one of said at least one counter piece is disposed at a center of an opposite transverse edge.

15. The ceiling panel according to claim 1, wherein said at least one fixation device and said at least one counter piece are constructed identically.

16. The ceiling panel according to claim 1, which further comprises a respective sealing lip disposed on at least one of said transverse edges.

17. The ceiling panel according to claim 16, wherein said sealing lip is formed of silicone.

18. The ceiling panel according to claim 1, wherein the vehicle is an aircraft.

19. A ceiling lining for an interior of a vehicle, the ceiling lining comprising:

a plurality of ceiling panels according to claim 1 disposed successively in the movement direction of the vehicle.

20. The ceiling lining according to claim 19, wherein the vehicle is an aircraft.

* * * * *